United States Patent
Kasai

(10) Patent No.: US 9,740,969 B2
(45) Date of Patent: Aug. 22, 2017

(54) PRINTER DEVICE

(71) Applicant: Motoki Kasai, Yamanashi-ken (JP)

(72) Inventor: Motoki Kasai, Yamanashi-ken (JP)

(73) Assignee: NISCA CORPORATION, Minamikoma-gun, Yamanashi-ken (JP)

( * ) Notice: Subject to any disclaimer, the term of this patent is extended or adjusted under 35 U.S.C. 154(b) by 0 days.

(21) Appl. No.: 15/261,130

(22) Filed: Sep. 9, 2016

(65) Prior Publication Data

US 2017/0076183 A1   Mar. 16, 2017

(30) Foreign Application Priority Data

Sep. 11, 2015   (JP) .................................. 2015-179531

(51) Int. Cl.
  *G06K 15/02* (2006.01)
  *B41J 3/407* (2006.01)
(52) U.S. Cl.
  CPC .......... *G06K 15/028* (2013.01); *B41J 3/4075* (2013.01); *G06K 15/022* (2013.01); *G06K 2215/0057* (2013.01); *G06K 2215/0097* (2013.01)
(58) Field of Classification Search
  CPC ....... B41F 16/00; B41F 16/0006; B41J 2/315; B41J 2/32; B41J 2/33; B41J 2/325; B41J 3/4075; B41J 2/385; B41J 2/435; B41J 2/4075; B41M 5/00; B41M 5/0041; B41M 5/0052; G06K 15/028; G06K 15/022; G06K 2215/0097; G06K 2215/0057
  See application file for complete search history.

(56) References Cited

U.S. PATENT DOCUMENTS

| | | | | |
|---|---|---|---|---|
| 2007/0217852 A1* | 9/2007 | Handa | ..................... | B41J 3/4075 400/615.2 |
| 2008/0165370 A1* | 7/2008 | Takayama | .............. | B41J 3/4075 400/615.2 |
| 2008/0247798 A1* | 10/2008 | Buzuev | .................. | B41J 3/4075 400/67 |

FOREIGN PATENT DOCUMENTS

| | | |
|---|---|---|
| JP | 2003-226056 A | 8/2003 |
| JP | 2014-166740 A | 9/2014 |

\* cited by examiner

*Primary Examiner* — Kristal Feggins
(74) *Attorney, Agent, or Firm* — Manabu Kanesaka

(57) ABSTRACT

The present invention is to provide a printer device capable of obtaining a print result having a good balance between characters in a predetermined print area and thus having good appearance. When the print length of an input character string is to be corrected, a comparison is first made in terms of the length of blank in each character and/or clearance between characters. In a case where minus correction is performed to reduce the print length, the blank or clearance is deleted by one column at a time preferentially from the area where the length of the blank and/or clearance is larger; while in a case where plus correction is performed to increase the print length, the clearance is added by one column at a time preferentially to the area where the length of the blank and/or clearance is smaller.

14 Claims, 10 Drawing Sheets

FIG. 7A

| A | | B | | L | |
|---|---|---|---|---|---|
| Left blank | Right blank | Left blank | Right blank | Left blank | Right blank |
| 3 | 2 | 4 | 3 | 5 | 3 |

FIG. 7B

| A | | B | | L | |
|---|---|---|---|---|---|
| Left blank | Right blank | Left blank | Right blank | Left blank | Right blank |
| 3 | 2 | 4 | 3 | 5 | 3 |
| | 6 | | 8 | | |

FIG. 7C

| A | | B | | L | |
|---|---|---|---|---|---|
| Left blank | Right blank | Left blank | Right blank | Left blank | Right blank |
| 3 | 2 | 4 | 3 | 4 | 3 |
| | 6 | | 7 | | |

FIG. 7D

| A | | B | | L | |
|---|---|---|---|---|---|
| Left blank | Right blank | Left blank | Right blank | Left blank | Right blank |
| 3 | 2 | 4 | 3 | 3 | 3 |
| | 6 | | 6 | | |

FIG. 7E

| A | | B | | L | |
|---|---|---|---|---|---|
| Left blank | Right blank | Left blank | Right blank | Left blank | Right blank |
| 3 | 2 | 3 | 3 | 3 | 3 |
| | 5 | | 6 | | |

FIG. 7F

| A | | B | | L | |
|---|---|---|---|---|---|
| Left blank | Right blank | Left blank | Right blank | Left blank | Right blank |
| 3 | 2 | 3 | 3 | 3 | 2 |
| | 5 | | 6 | | |

FIG. 7G

| A | | B | | L | |
|---|---|---|---|---|---|
| Left blank | Right blank | Left blank | Right blank | Left blank | Right blank |
| 2 | 2 | 3 | 3 | 3 | 2 |
| | 5 | | 6 | | |

PRINTER DEVICE

BACKGROUND OF THE INVENTION

Field of the Invention

The present invention relates to a printer device and, more particularly, to a printer device provided with a print section that applies print processing to a recoding medium and a control section that corrects print data.

Description of the Related Art

Conventionally, there is known a printer device, such as a tube printer or a label printer, that applies print processing to an elongated recording medium such as a tube or a label and then cuts the recording medium. There may be a case where a printed matter printed by such a printer device is used as a marking plate. In this case, it is preferable that a block interval of the printed matter coincides with an electrode interval of the making plate. Thus, a length of a print area is specified so as to match the electrode interval, a character string is input so as to be included within the print area, followed by printing, cutting, and outputting (for example, Patent Document 1).

Further, there has been disclosed a method of including a character string within a fixed print area discloses. According to this method, when the character string is not included within the print area, a head blank part is deleted, or inter-character clearances are deleted across the board before reducing the size of the character string (for example, Patent Document 2).

PRIOR ART DOCUMENT

Patent Document

[Patent Document 1] Japanese Patent Application Publication No. 2003-226056

[Patent Document 2] Japanese Patent Application Publication No. 2014-166740

Assume that correction (plus correction of increasing the print length, or minus correction of reducing the print length) of a print length is performed in a character string to be printed in which a character having a high dot area ratio (e.g., "W") and a character having a low dot area ratio (e.g., "I") are mixed. In this case, when the across-the-board correction of the print area is performed like the inter-character clearance correction described in Patent Document 2, unbalance may occur between inter-character clearances, resulting in bad appearance.

SUMMARY OF THE INVENTION

The present invention has been made in view of the above situation, and the object thereof is to provide a printer device capable of obtaining a print result having a good balance between characters and thus having good appearance.

To solve the above problem, according to an aspect of the present invention, there is provided a printer device that prints a character string on a recording medium having a predetermined area, the device including: a character string acquisition unit that acquires the character string to be printed; a correction value acquisition unit that acquires a correction value for use in correction of a print length of the character string; a blank column part acquisition unit that detects or reads out a blank column part existing in each character data in the character string; a control unit that corrects the print length of the character string based on the correction value; and a print unit that prints the character string corrected by the control unit. The control unit makes a comparison in terms of length of the blank column part in each character data acquired by the blank column part acquisition unit and performs the correction so as to increase or decrease the print length of the character string based on the comparison result.

According to another aspect of the present invention, there is provided a printer device that prints a character string on a recording medium having a predetermined area, the device including: a character string acquisition unit that acquires the character string to be printed; a correction value acquisition unit that acquires a correction value for use in correction of a print length of the character string; a blank column part/clearance column part acquisition unit that detects or reads out a blank column part in each character data and a clearance column part between adjacent character data in the character string; a control unit that corrects the print length of the character string based on the correction value; and a print unit that prints the character string corrected by the control unit. The control unit makes a comparison in terms of the total length of the blank column part and clearance column part between one character data and another character data acquired by the blank column part/clearance column part acquisition unit and performs the correction so as to increase or decrease the print length of the character string based on the comparison result.

According to still another aspect of the present invention, there is provided a printer device that prints a character string on a recording medium having a predetermined area, the device including: a character string acquisition unit that acquires the character string to be printed; a correction value acquisition unit that acquires a correction value for use in correction of a print length of the character string; a clearance column part acquisition unit that detects or reads out a clearance column part between adjacent character data in the character string; a control unit that corrects the print length of the character string based on the correction value; and a print unit that prints the character string corrected by the control unit. The control unit makes a comparison in terms of the length of the clearance column part between adjacent character data acquired by the clearance column part acquisition unit and performs the correction so as to increase or decrease the print length of the character string based on the comparison result.

In the present invention, when the print length of an input character string is corrected, a comparison is first made in terms of the length of the blank in each character and/or clearance between characters. In a case where the minus correction is performed to reduce the print length, the blank or clearance is deleted by one column at a time preferentially from the area where the length of the blank and/or clearance is larger; while in a case where the plus correction is performed to increase the print length, the clearance is added by one column at a time preferentially to the area where the length of the blank and/or clearance is smaller. Thus, a print result having a good balance between characters in the print area and thus having good appearance can be obtained.

BRIEF DESCRIPTION OF THE DRAWINGS

FIGS. 2A and 2B are views each illustrating an attachment attachable to an attachment section of the tube printer according to the embodiment, in which FIG. 2A is a plan view of a label cassette, and FIG. 2B is a plan view of a tube attachment;

FIGS. 5A and 5B are views each illustrating a character string input in the embodiment, in which FIG. 5A illustrates an input state of characters, and FIG. 5B illustrates a state where a clearance between the adjacent characters is deleted through minus correction;

FIGS. 6A and 6B are views each illustrating a character string input in the embodiment, in which FIG. 6A illustrates a state where no clearance exists between characters, and FIG. 6B illustrates a state where a blank in each character is deleted through the minus correction;

FIGS. 7A to 7G are tables illustrating the number of columns corresponding to the blank in the input character string in the print length correction of the embodiment, in which FIG. 7A illustrates an initial state, and FIGS. 7B to 7G illustrate changes in the number of columns corresponding to the blank when the blank is deleted by one column at a time;

FIGS. 11A and 11B are views illustrating an input character string in the print length correction of the embodiment, in which FIG. 11A illustrates an input state of characters, and FIG. 11B illustrates a state where a clearance 53 is inserted between the adjacent characters through plus correction of the print length.

DESCRIPTION OF THE PREFERRED EMBODIMENTS

Hereinafter, an embodiment in which the present invention is applied to a tube printer that prints arbitrary characters on a recording medium such as a tube and then cuts the recording medium will be described.
(Configuration)
<Entire Configuration>

Figure 1:
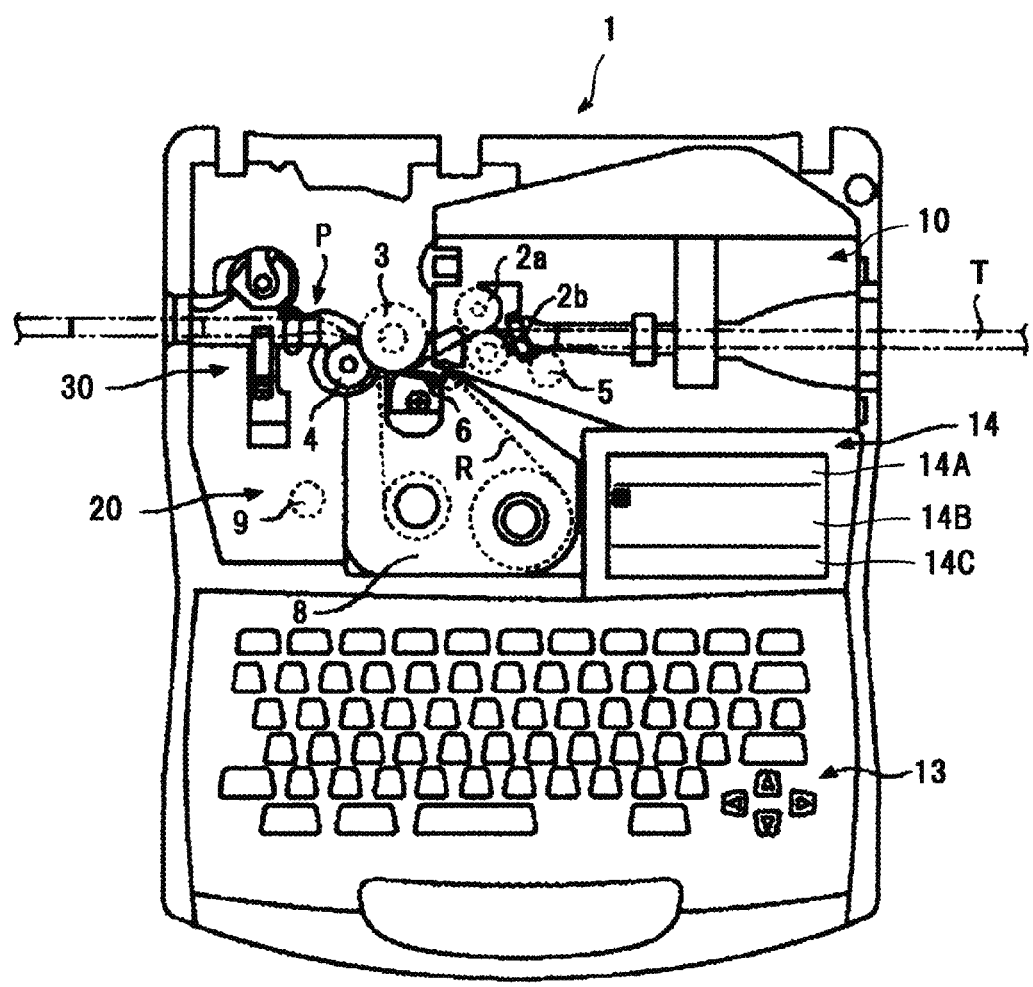
FIG. 1 is an external view of a tube printer of an embodiment to which the present invention can be applied.
Figure 4:
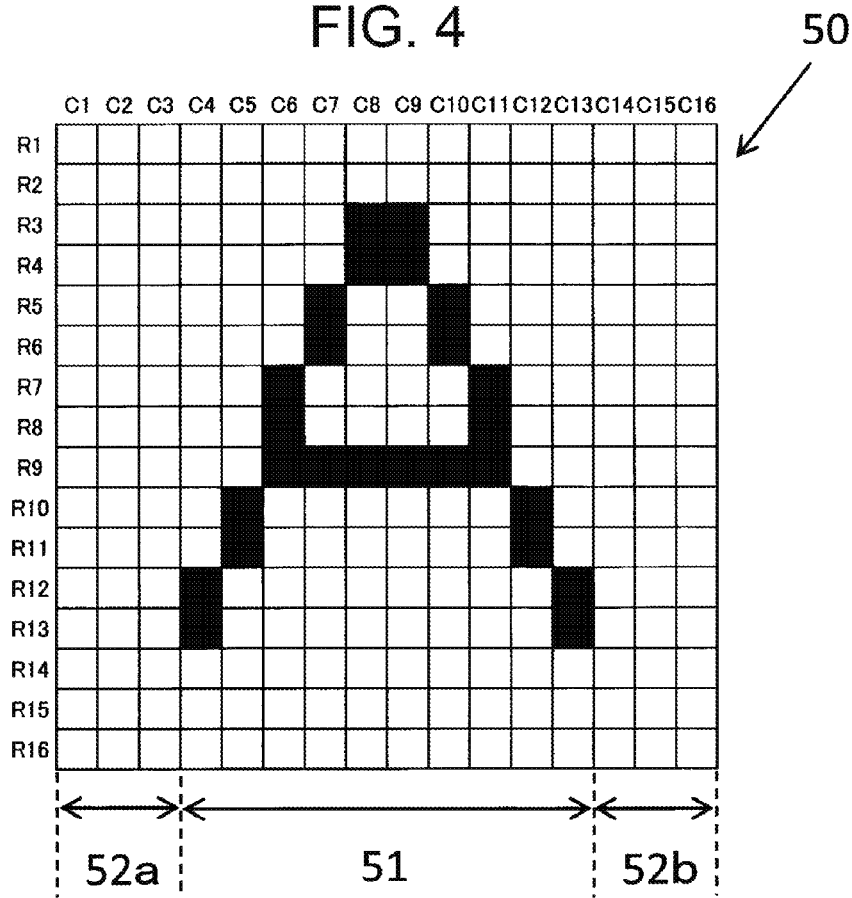
FIG. 4 is a view illustrating an example of character data in the present embodiment.

As illustrated in FIG. 1, a tube printer 1 according to the present embodiment is configured so as to be portable like a note-type computer and roughly includes an input section 13 having a keyboard and an input controller, a display section 14 having an LCD and a display controller, a print section 20 that selectively heats a plurality of heating elements that are arranged in a main scan direction and constitute a thermal head 6 to apply print processing to a recording medium, a cutting section 30 that is provided downstream of a medium transfer direction of the print section 20 and applies cutting processing to the recording medium, and a control section 15 (see FIG. 4) that controls the above components. Further, in the tube printer 1, a conveying path P for conveying the recording medium is formed.
<Input Section>

The input section 13 includes, like a note-type computer, function keys, character/numerical/symbol keys, space keys, conversion keys, cross-direction keys, return keys, and the like. An operator operates these keys to input a recording medium type including a tube T, a size, a print/cutting condition to thereby set print information and cutting information.
<Display Section>

The LCD of the display section 14 is divided into three display areas: a various information display area 14A that displays an input mode and the like; a character information display area 14B that displays characters, numerals, symbols (hereinafter, collectively referred to as "characters") input through the input section 13; a parameter display area 14C that displays a character size and the like. The various information display area 14A and parameter display area 14C are disposed above and below the character information display area 14B, respectively.

On the various information display area 14A, the following contents are displayed: an input mode view for selecting one of the following input modes to be used in inputting characters through the input section 13: alphanumeric character mode; Roman character (Romaji) mode; and Hiragana (Japanese syllabary character) mode; an insert/overwrite mode view (edit mode) for selecting one of the following input modes to be used in inputting characters through the input section 13: insert mode and overwrite mode; a print medium type view; a mode instruction (full cutting mode or half cutting mode, and the number of cuts) view for displaying an instruction of how a page cut operation is performed when a plurality of pages are printed at a time; a cutting length/text alignment/margin view displaying "cutting length" which is the length of one tube (one label), "text alignment" indicating whether a text alignment is center-aligned or left-aligned, and "margin" which is a space between the left end of the tube and the first character; a preceding page view displayed when there exists another page before the currently displayed page; a succeeding page view displayed when there exists another page after the currently displayed page; a tube feeder view displaying that a tube attachment (see FIG. 2B) is attached; and a power supply view displaying that a power supply is on; and the like.

On the parameter display area 14C, the following contents are displayed: a page view displaying what page number is being displayed by a numerical value; a print direction view for selecting a print direction from one of "lateral direction (paper direction)/lateral writing (text direction)", "longitudinal direction/vertical writing", and "longitudinal direction/lateral writing"; an enclosed character view displaying a selected enclosure; a character size view displaying a selected character size; a number-of-lines view displaying the number of lines to be printed; a character spacing view displaying a selected character spacing size; a continuous printing view displaying a page number on which the currently displayed character is to be printed; and the like.

On the character information display area 14B, a character string of characters (strictly, characters obtained by applying predetermined conversion to input character data) input through the input section 13 is displayed. Further, on the character information display area 14B, a cursor is displayed at an operator input position (see FIG. 1).
<Print Section>

The print section 20 includes conveying rollers 2a and 2b for conveying a recording medium, a platen roller 3 disposed downstream of the conveying rollers 2a and 2b so as to be opposite to a thermal head 6, and a pinch roller 4 disposed downstream of the platen roller 3 so as to be opposite to the platen roller 3.

An ink ribbon R is interposed between the platen roller 3 and the thermal head 6. The ink ribbon R is supplied from a ribbon supply reel of an ink ribbon cassette 8 and wound around a ribbon winding reel.

A stepping motor 5 is disposed upstream of the conveying rollers 2a and 2b. The stepping motor 5 drives, through an unillustrated gear, the conveying rollers 2a and 2b, platen roller 3, and a spool of the ribbon winding reel of the ink ribbon cassette 8 into rotation. Further, a stepping motor 9 is disposed on one side (left side in FIG. 1) of the ribbon cassette 8 and, thus, on one side (lower side in FIG. 1) of the cutting section 30. The stepping motor 9 moves, through an unillustrated gear and a cam, the thermal head 6 from a retreating position retreating from the conveying path P to a print position where the thermal head 6 is brought into pressure contact with the platen roller 3.

FIG. 1 illustrates a state where the tube T is attached as a recording medium. According to this example, upon printing, the thermal head 6 is brought into pressure contact with the tube T with the ink ribbon R of the ink ribbon cassette 8 interposed therebetween, and the heating elements constituting the thermal head 6 are selectively heated according to print data input through the input section 13 to melt ink on the ink ribbon R, whereby a character string is printed on the tube T line by line.

Further, a transmission integrated type sensor is disposed upstream of the conveying rollers 2a and 2b and downstream of the pinch roller 4. This sensor detects presence/absence of a recording medium and a leading end of the conveyed recording medium.

<Attachment Section>

Figure 2A:
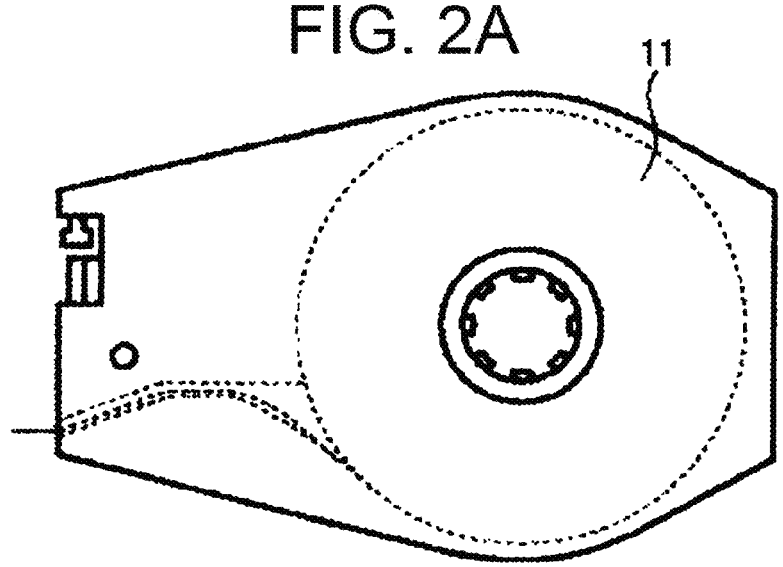
Figure 2B:
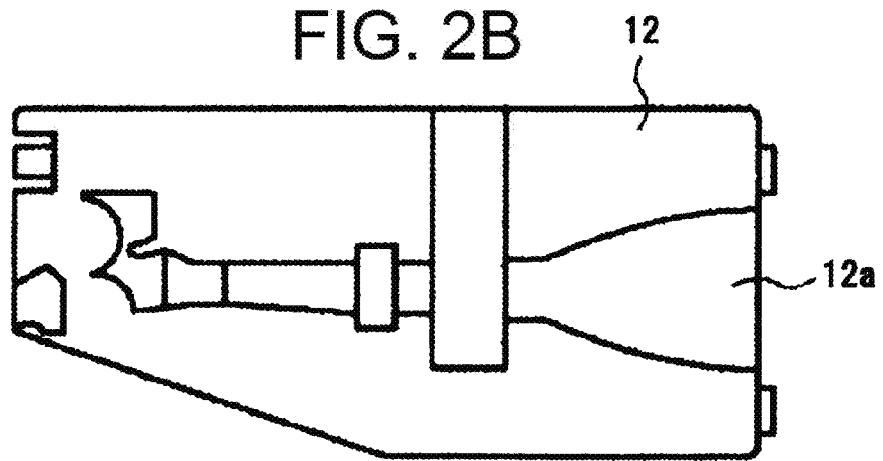

In the tube printer 1, printing and cutting processing can be performed for various kinds of recoding medium by changing an attachment to be attached to an attachment section 10. FIGS. 2A and 2B are views illustrating configuration examples of a label cassette and a tube attachment. For example, when a label cassette 11 of FIG. 2A is attached to the attachment section 10, a label with release paper is drawn from the inside of the cassette, allowing printing and cutting processing to be applied to the drawn label. When a tube attachment 12 of FIG. 2B is attached to the attachment section 10, the tube T is inserted through a tube insertion port 12a, allowing printing and cutting processing to be applied to the inserted tube T. Hereinafter, as illustrated in FIG. 1, a case where the tube attachment 12 is attached to the attachment section 10, that is, a case where the tube T is used as a print medium will be described mainly.

<Cutting Section>

As illustrated in FIG. 1, the cutting section 30 is disposed downstream of the pinch roller 4. The cutting section 30 applies cutting processing to a recording medium such as the tube T or label. Specifically, the cutting section 30 uses a cutter blade and a cutter receiving member to apply half-cutting or full-cutting to a recording medium that has been subjected to printing processing by the print section 20 and then discharges the resultant recording medium.

<Control Section>

Figure 3:
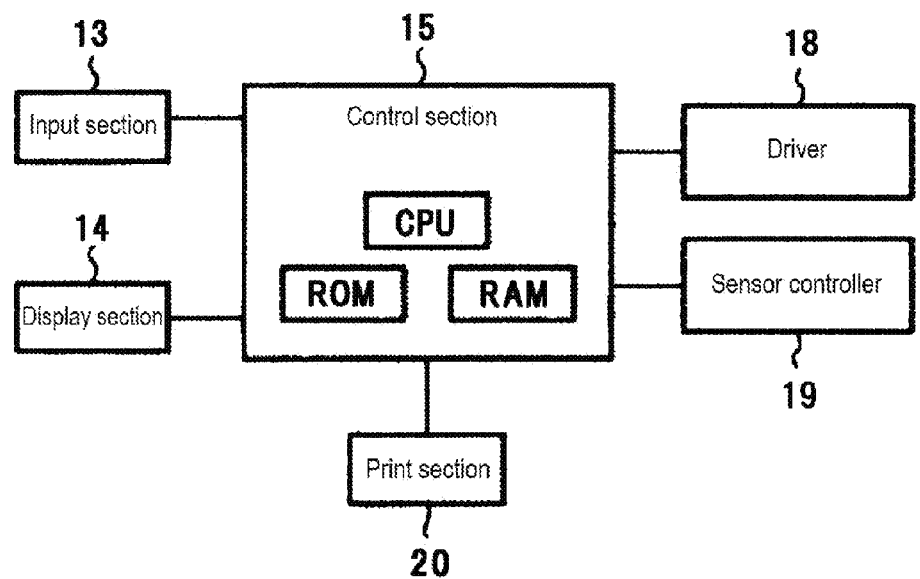
FIG. 3 is a block diagram illustrating a control section and a connection system of the tube printer according to the embodiment.

As illustrated in FIG. 3, the control section 15 includes a CPU that operates at high speed as a central processing unit, a ROM that stores a basic control program of the tube printer 1 and program data (including all bitmap fonts forming a character output pattern), and a RAM that functions as the work area of the CPU. The CPU, ROM, and RAM are connected to each other by an internal bus. The ROM has a memory area for storing output character data of each character. On the memory, character data 50 of each character is expressed in a matrix of 16×16 dots (in the present embodiment), and all character data 50 are stored with the same memory amount (32 bytes). That is, the character data 50 is constituted of 16 columns from C1 to C16 and 16 rows from R1 to R16 (see FIG. 4). Further, the character data 50 is constituted of a valid dot column part (hereinafter, referred to as "valid dot 51") in which one or more dots to be printed (hereinafter, referred to as "on-dot") are included in each column and a blank column part 52 (hereinafter, "blank 52") in which no on-dot is included in each column. The blank 52 includes a left blank 52a disposed to the left of the valid dot 52 and a right blank 52b disposed to the right of the valid dot 51. In some characters, the blank 52 is disposed only on one side of the valid dot 51.

The character data 50 each having a fixed length are stored in the memory (ROM) in the order of the character code. When a given character is to be output, it is determined at which position from the character code of "A" the character to be output is situated. The address obtained by advancing a reference address by a value obtained by multiplying the number showing the order by the memory amount of 32 bytes corresponds to a head address of the storage area of the character data 50 of the character to be output. From the obtained head address, the character data 50 corresponding to 32 bytes is read and output in a dot pattern of 16×16 dots.

The control section 15 is connected with an external bus. The external bus is connected with the input controller of the input section 13, display controller of the display section 14, thermal head 6 of the print section 20, a driver 18 that controls operations of the stepping motors 5 and 9, and a sensor controller 19 that controls information from a sensor. The driver 18 is connected with the above-described stepping motors 5 and 9, and the sensor controller 19 is connected with a sensor. Further, the control section 15 has an unillustrated buffer or an interface and can thus be connected to a host device such as a personal computer through an external bus. This allows an operator to input data from a personal computer in place of inputting data through the input section 13. Further, when an external storage device such as a RAM card or a USB is attached, data stored in the external storage device can be utilized.

<Correction of Print Length of Character String>

In the present embodiment, a clearance 53 (clearance column part) between adjacent character data 50 and/or blank 52 in the character data 50 are detected or read out from the character string input through the input section 13, a comparison is made in terms of the length of the clearance 53 and/or blank 52 in the print direction, and the clearance 53 and/or blank 52 are increased/decreased based on a result of the comparison, whereby the print length is corrected so as to arrange the characters in good balance in the print area of a predetermined length, and thus a print result with good appearance can be obtained. Correction that reduces the print length is referred to as minus correction, and correction that increases the print length is referred to as plus correction.

Figure 5A:
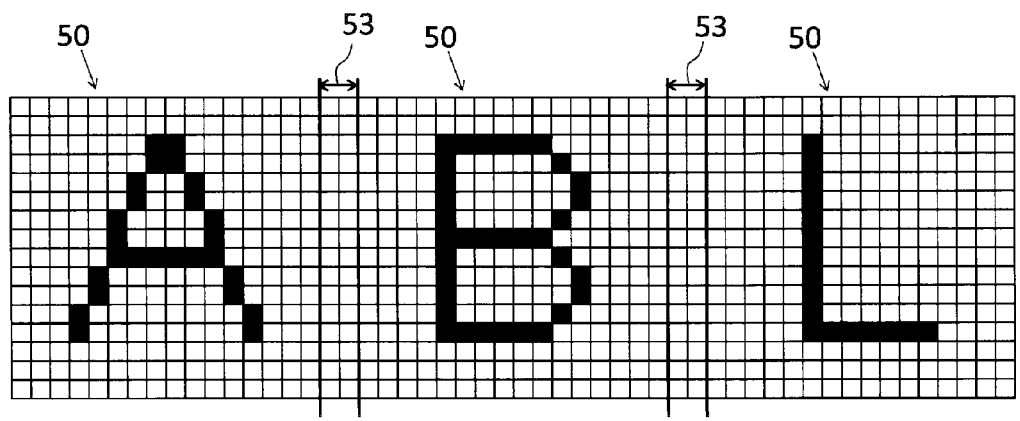

In the present embodiment, an embodiment will be described, in which a predetermined amount of the clearance and/or blank 52 are deleted so as to include the character string within the print area. FIG. 5A illustrates an example of character string data input through the input section 13 (a thick line between adjacent character data 50 represents a boundary line and is not printed data). In the present embodiment, a clearance 53 corresponding to two columns (hereinafter, referred to as "two-column clearance 53" for descriptive convenience) having a width of two dots exists between the adjacent character data 50. Thus, two-column clearance 53 exists between "A" and "B", and between "B" and "L" of the character string "ABL". Each character block is composed of 16 dots in width, so that the entire width of the character string is 52 dots (16+2+16+2+16). However, when the width of the print area is set to 49 dots, it is necessary to delete the character string data corresponding to three columns. Otherwise, the character may be printed beyond the print area, or there occurs a necessity of reducing the character string data.

In a conventional approach, when the print length is corrected, the inter-character clearances 53 are deleted across the board; on the other hand, in the present embodiment, a priority is given to data of the column to be deleted, whereby a print result having a good balance between characters can be obtained.

In the present embodiment, when the three-column clearance 53 is deleted as described above, the length of the clearance 53 and that of the blank 52 are detected or read out from the memory, and the column is deleted preferentially from the clearance 53 included in the area where the total length of the clearance 53 and blank 52 between one valid dot 51 of the character data 50 and the subsequent valid dot 51 is larger. In other words, the clearance 53 is deleted preferentially from the clearance included in the area where the number of columns corresponding to the clearance 53 and blank 52 between one valid dot 51 of the character data 50 and the subsequent valid dot 51 is larger. In the character string "ABL" of FIGS. 5A and 5B, the number of columns corresponding to the clearance 53 and blank 52 between "A" and "B" is 9, and that between "B" and "L" is 11.

Figure 5B:
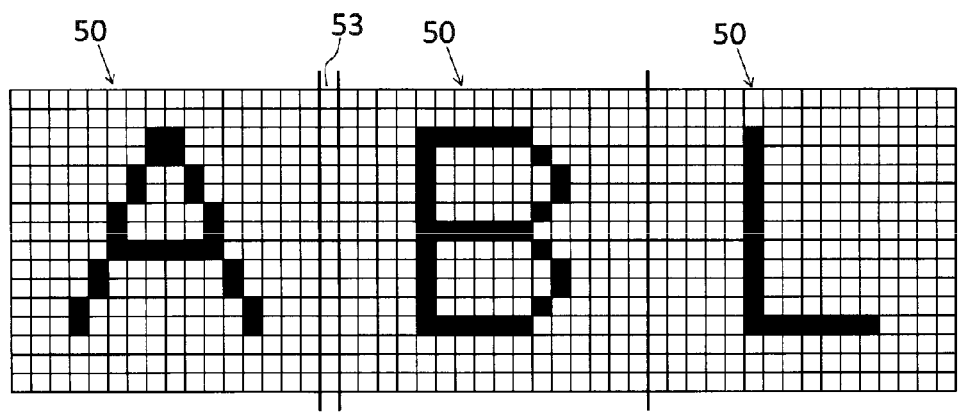

Thus, one column is deleted first from the clearance 53 between "B" and "L". As a result, the number of columns corresponding to the clearance 53 and blank 52 between "A" and "B" is 9 and that between "B" and "L" is 10. The number of columns corresponding to the clearance 53 and blank 52 between "B" and "L" is still larger than that between "A" and "B", so that one column is deleted again from the clearance 53 between "B" and "L". As a result, the number of columns corresponding to the clearance 53 and blank 52 between "A" and "B" is 9 and that between "B" and "L" is also 9. At this time, the number of columns corresponding to the clearance 53 between "B" and "L" is 0, so that, in the subsequent step, one column is deleted from the clearance 53 between "A" and "B". As a result, three-column clearance 53 is deleted, whereby the character string is included within the print area (FIG. 5B).

In the stage where the clearance 53 is still present both between "A" and "B" and "B" and "L", the numbers of columns corresponding to only the clearances 53 may be compared so as to delete one column from the clearance 53 of which the number of columns is larger.

Figure 6A:
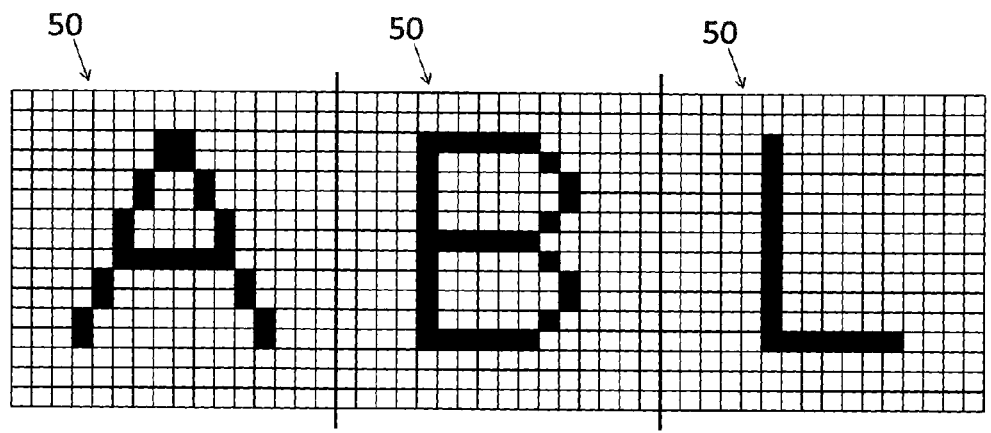

Conventionally, when the number of columns corresponding to the clearance 53 in the character string data is 0 as illustrated in FIG. 6A, the character data 50 needs to be reduced; on the other hand, in the present embodiment, the character string can be included within the print area without reducing the character data 50 by deleting the blank 52. For example, when data corresponding to five columns needs to be deleted from the character string data of FIG. 6A, the number of columns corresponding to the blanks 52 positioned to the left and right of the valid dot 51 in each character data 50 is detected, the detected result is compared between the character data 50 of "A", "B", and "L", and the column is deleted from the blank 52 of which the number of columns is larger.

Information concerning the blank 52 in the character string "ABL" of FIG. 6A may previously be stored in the ROM; in this case, the information is read out from the ROM as needed. Alternatively, the blank 52 may be detected from the character string data when the print length is to be corrected.

The reading or detection result of the blank 52 in the character data "A" reveals that three-column blank 52a exists on both the left and right sides. However, when no blank 52 exists between the adjacent valid dots 51, adjacent characters are connected to each other, resulting in bad appearance. Therefore, one column (C16 (see FIG. 4), in the present embodiment) in the blank 52a on the right side of the valid dot 51 is excluded from the deletion target in the correction. That is, the number of the columns corresponding to the right blank 52b that can be deleted is 2. Similarly, in the character data "B", four-column blank 52a exists on the left side, and three-column blank 52b exists on the right side. Further, in the character data "L", five-column blank 52a exists on the left side, and three-column blank 52b exists on the right side. FIG. 7A is a table illustrating the above detection results. When this table is previously stored in the ROM, it is only necessary to read a table corresponding to an input character string and to store it in the RAM; on the other hand, when the blank 52 is newly detected, a table representing the detection results is generated and stored in RAM.

Then, as illustrated in FIG. 7B, the number of columns corresponding to the blank 52 between the adjacent characters is calculated. It can be seen from the table of FIG. 7B, the number of columns corresponding to the blank 52 between "A" and "B" is 6 and that between "B" and "L" is 8. When the print length is minus-corrected, basically, the column is deleted one by one from the blank 52 of which the number of columns is larger. However, when the numbers of columns corresponding to the blank 52 are the same, the column is deleted from the right blank 52b of the last character (in the present embodiment, right blank 52b of "L"). Otherwise, the column is deleted from the left blank 52a of the first character (in the present embodiment, left blank 52a of "A"). When neither the right blank 52b of the last character and left blank 52a of the first character exist, a comparison is made in terms of the sum of the number of columns corresponding to the blank 52 between adjacent characters, and the column is deleted from the blank 52 belonging to a pair of left and right blanks 52a and 52b having a larger number of columns.

For example, when the print length is minus-corrected by five columns, the area where the number of deletable columns is largest is the left blank 52a (five columns) of "L", and thus, one column is deleted therefrom, followed by update of the table (FIG. 7C).

The area where the number of deletable columns is largest in the updated table of FIG. 7C is the left blank 52a (four columns) of "B" and left blank 52a (four columns) of "L". Thus, the sum (six columns) of the number of columns corresponding to the right blank 52b of "A" and the number of columns corresponding to the left blank 52a of "B" and the sum (seven columns) of the number of columns corresponding to the right blank 52b of "B" and the number of columns corresponding to the left blank 52a of "L" are compared to each other, and the column is deleted from the blank 52 belonging to a pair of left and right blanks 52a and 52b having a larger number of columns. That is, one column is deleted from the left blank 52a of "L", followed by update of the table (FIG. 7D).

Figure 6B:
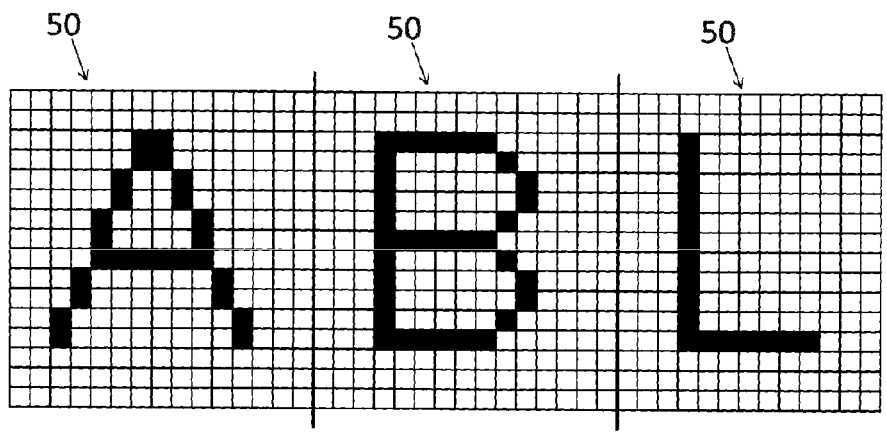

The area where the number of deletable columns is largest in the updated table of FIG. 7D is the left blank 52a (four columns) of "B", so that one column is deleted therefrom, followed by update of the table (FIG. 7E). The area where the number of deletable columns is largest in the updated table of FIG. 7E is the left blank 52a (three columns) of "A", left blank 52a (three columns) of "B", right blank 52b (three columns) of "B", left blank 52a (three columns) of "L", and right blank 52b (three columns) of "L". In the above areas, the right blank of the last character (right blank of "L") is included, so that one column is deleted therefrom, followed by update of the table (FIG. 7F). The area where the number of deletable columns is largest in the updated table of FIG. 7F is the left blank 52a (three columns) of "A", left blank 52a (three columns) of "B", right blank 52b (three columns) of "B", and left blank 52a (three columns) of "L". In the above areas, the left blank of the first character (left blank of "A") is included, so that one column is deleted therefrom, followed by update of the table (FIG. 7G). FIG. 6B illustrates the result of deletion of data having a width of 5 dots. As illustrated in FIG. 6B, a print result having a good balance between characters and thus having good appearance can be obtained.

The following described an embodiment for detecting the blank 52.

Figure 8:
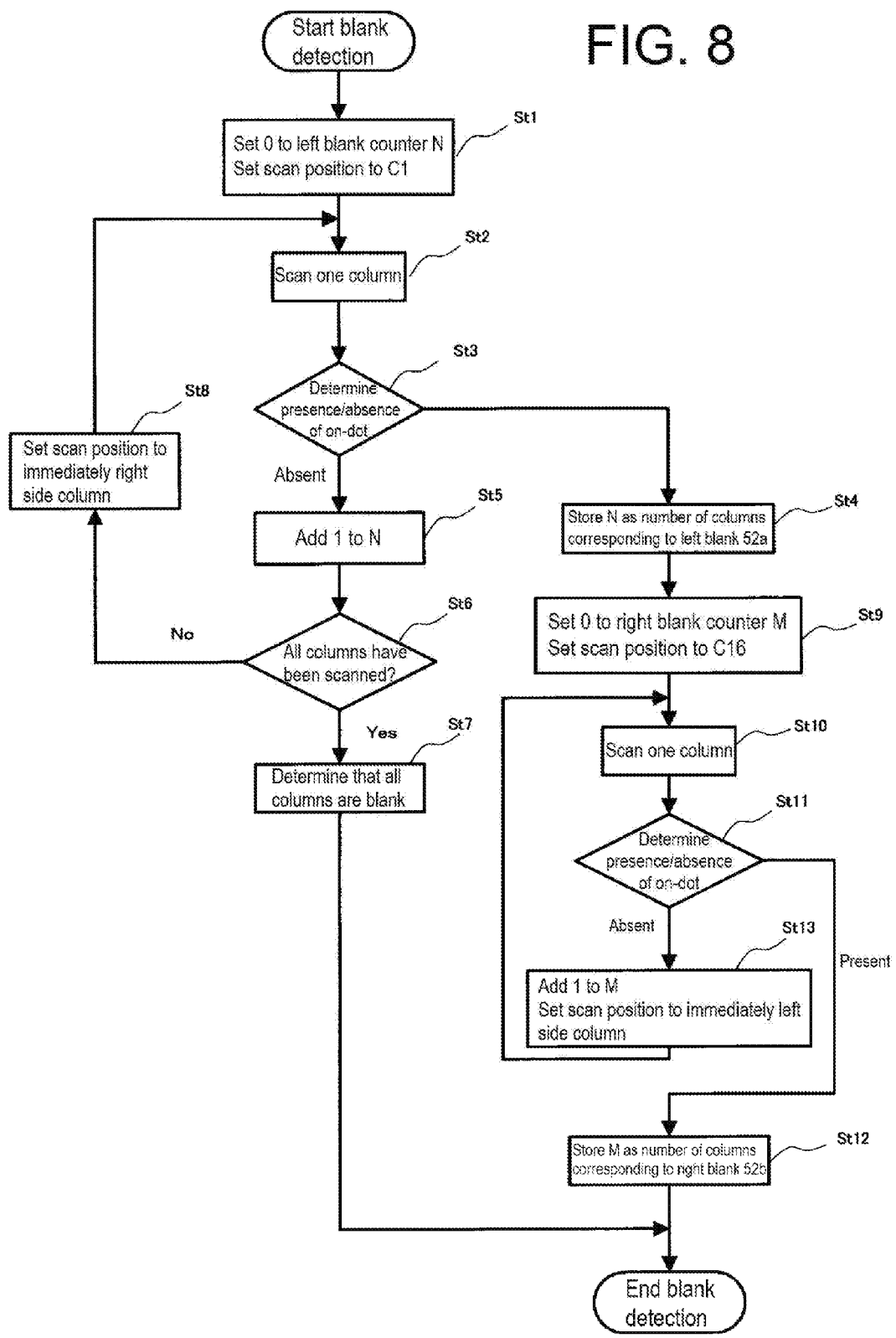
FIG. 8 is a flowchart of a blank detection procedure executed by a CPU.

A detection procedure of the blank 52 will be described using a flowchart of FIG. 8. First, the blank 52a on the left side of the valid dot 51 in the character data 50 is detected, and then the blank 52b on the right side of the valid dot 51 is detected. The following description will be made by taking the character "A" as a representative example. When the character "A" is input, the CPU of the control section 15 (hereinafter, referred to merely as "CPU") initializes the RAM for blank detection. Then, the CPU specifies the left end column (C1 of FIG. 4) as the start position of blank detection and sets 0 to a left blank counter N (the number of columns corresponding to the blank) (St 1).

Then, the CPU scans dot by dot the specified column from R1 to R16 whether or not the on-dot data is present (St 2). The CPU determines the presence/absence of the on-dot (St 3). When the on-dot is present in the target column, the CPU ends the scan and stores the number indicated by the left blank counter N as the number of columns corresponding to the left blank 52a (St 4). When there is no on-dot in the target column, 1 is added to the left blank counter N (St 5). Here, the CPU determines whether or not all the columns have been scanned (St 6). When determining that all the columns have been scanned, the CPU determines that all the columns are blank, stores 16 as the number of columns corresponding to the blank 52 (St 7), and ends this routine. When determining that not all the columns have been scanned, the CPU specifies the immediately right side column as the target column (St 8) and starts scanning (St 2 to St 8). Specifically, the on-dot is detected in the 12th row (R12) of the fourth column (C4) from the left end, so that the detection of the left blank 52a is ended with the left blank counter N being 3.

When the on-dot is present in St 3, the CPU then performs detection of the right blank 52a. First, the CPU specifies the right end column (C16 of FIG. 4) as the start position of blank detection and sets 0 to a right blank counter M (St 9). Then, the CPU scans dot by dot the specified column from R1 to R16 whether or not the on-dot data is present (St 10). The CPU determines the presence/absence of the on-dot (St 11). When the on-dot is present in the target column, the CPU ends the scan and stores the number indicated by the right blank counter M as the number of columns corresponding to the right blank 52a (St 12). When there is no on-dot in the target column, 1 is added to the right blank counter M, and then CPU specifies the immediately left side column as the target column (St 13) and starts scanning (St 10 to St 13). Specifically, the on-dot is detected in the 12th row (R12) of the fourth column (C13) from the right end, so that the detection of the right blank 52a is ended with the right blank counter M being 3.

As a result, the number of columns corresponding to the left blank 52a and that corresponding to the right blank 52b are detected. Specifically, the number of the columns corresponding to the left blank 52a is 3, and that corresponding to the right blank 52b is 3; however, C16 is excluded from the deletion target, so that the number of the columns corresponding to the right blank 52b is 2 (=3−1).

The following describes print operations of the tube printer 1 according to the present embodiment. Here, operations of the CPU of the control section 15 will be mainly described. The present embodiment includes (1) an embodiment in which an input character string and the print area are compared so as to automatically delete the clearance 53 and blank 52, and (2) an embodiment in which an operator inputs a correction value so as to delete the clearance 53 and blank 52.

Figure 9:
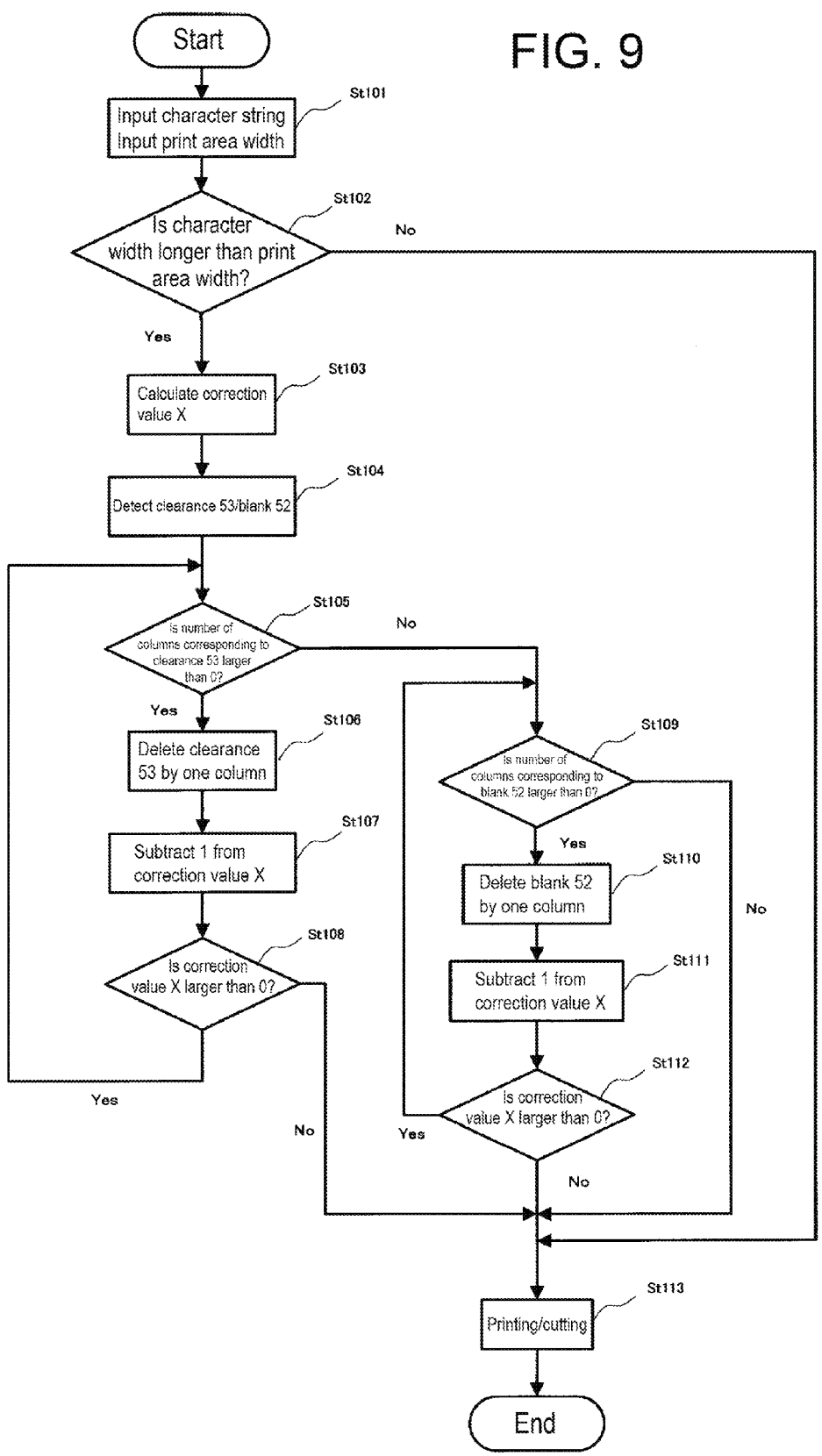
FIG. 9 is a flowchart of a print operation executed by the CPU, which illustrates an embodiment in which a correction value for print length correction is calculated.

(1) The embodiment in which automatic correction is performed will be described with reference to a flowchart of FIG. 9.

First, a character string and a print area width are input by an operator (St 101). The CPU compares the width of the input character string and the print area width (St 102). When the character string is included within the print area width, the CPU performs printing and cutting (St 113) and then ends this routine. When the character string is not included within the print area width, the CPU calculates a correction value X (St 103) and detects the clearance 53 and blank 52 (St 104). Then, the CPU determines whether or not the number of columns corresponding to the clearance 53 is equal to or larger than 1 (St 105). When determining that the number of columns corresponding to the clearance 53 is equal to or larger than 1, the CPU deletes the clearance 53 by one column at a time. Specifically, as described above, a comparison is made in terms of the number of the columns corresponding to the clearance 53 and blank 52 between the characters, and the clearance 53 is deleted by one column from the area where the number of columns corresponding to the blank 52 and clearance 53 is larger.

After deleting the clearance 53 by one column (St 106), the CPU subtracts 1 from the correction value X (St 107) and then determines whether or not the correction value X is equal to or larger than 1 (whether or not the character string is included within the print area width) (St 108). When determining that the correction value X is 0, the CPU performs printing and cutting (St 113) and ends this routine. When determining that the correction value X is equal to or larger than 1, the CPU determines whether or not there still exists the clearance 53 (St 105) and repeats deletion of the clearance 53 until the number of columns corresponding to the clearance 53 becomes 0 or until the correction value X becomes 0.

When the number of columns corresponding to the clearance 53 and correction value X is 0 and equal to or larger than 1, respectively, the CPU deletes the blank 52 by one column at a time. Specifically, as described above, a comparison is made in terms of the number of columns corresponding to the left blank 52a of the character and that of the right blank 52b, and one column is deleted from the blank 52 of which the number of columns is larger. The CPU determines whether or not the number of columns corresponding to the blank 52 is equal to or larger than 1 (St 109). When determining that the number of columns corresponding to the blank 52 is equal to or larger than 1, the CPU deletes the blank 52 by one column (St 110). Then, the CPU subtracts 1 from the correction value X (St 111) and then determines whether or not the correction value X is equal to or larger than 1 (St 112). When determining that the correction value X is 0, the CPU performs printing and cutting (St 113) and ends this routine. When determining that the correction value X is equal to or larger than 1, the CPU determines whether or not there still exists the blank 52 (St 109) and repeats deletion of the blank 52 until the correction value X becomes 0 or the number of columns corresponding to the blank 52 becomes 0. When determining that at least one of the correction value X and the number of columns corresponding to the blank 52 becomes 0, the CPU performs printing and cutting (St 113) and ends this routine. When the correction value X and the number of columns corresponding to the blank 52 are equal to or larger than 1 and 0, respectively, the character string may be reduced and then printed, or an alarm may be displayed on the display section 14.

Figure 10:
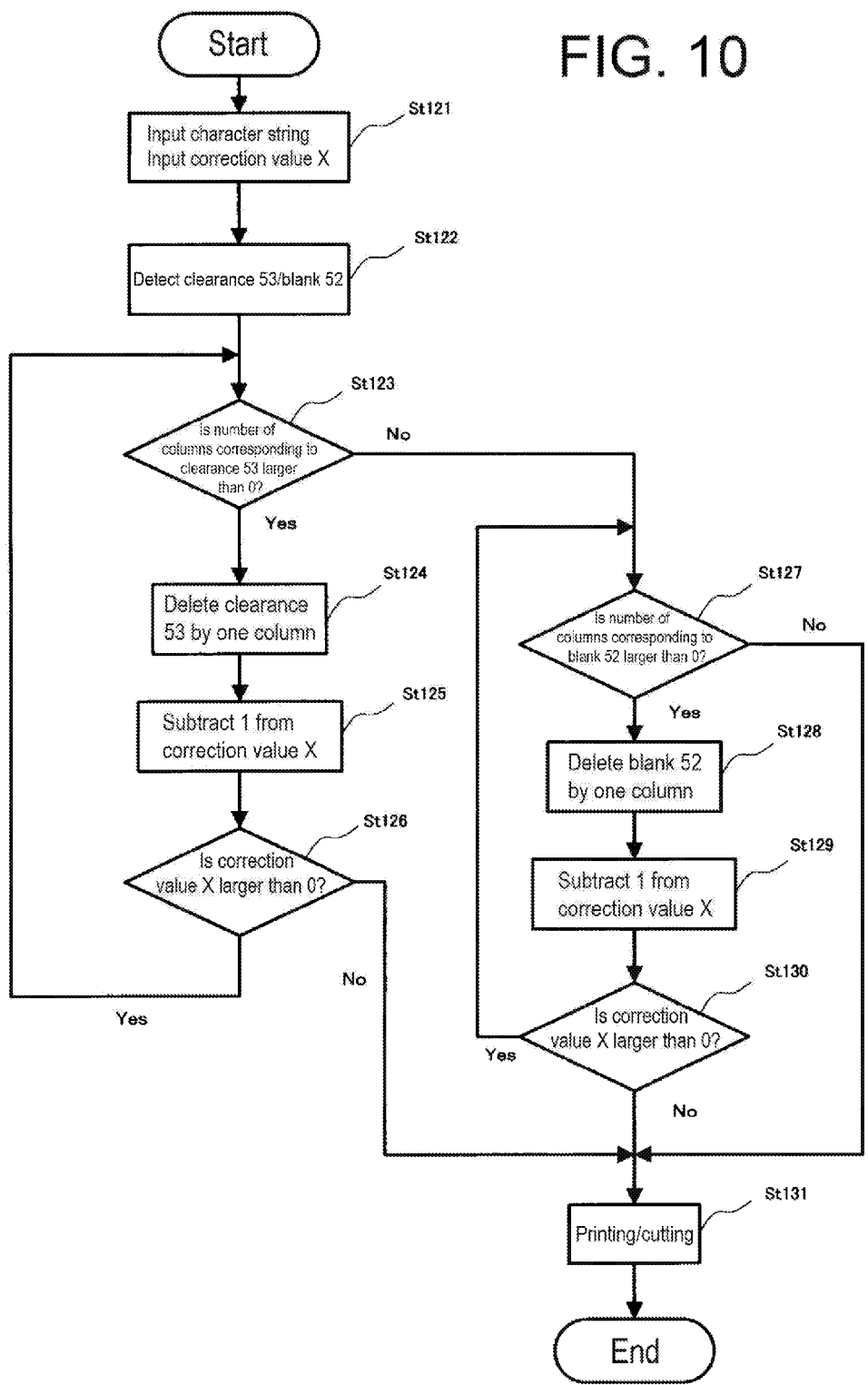
FIG. 10 is a flowchart of a print operation executed by the CPU, which illustrates an embodiment in which an operator inputs a correction value for print length correction.

(2) The embodiment in which an operator inputs the correction value X will be described with reference to a flowchart of FIG. 10.

First, an operator inputs a character string and a correction value X (St 121). The CPU detects or reads out the clearance 53 and blank 52 (St 122) and determines whether or not the number of columns corresponding to the clearance 53 is equal to or larger than 1 (St 123). When determining that the number of columns corresponding to the clearance 53 is equal to or larger than 1, the CPU deletes the clearance 53 by one column from the area where the number of columns corresponding to the blank 52 and clearance 53 is larger (St 124) and subtracts 1 from the correction value X (St 125). Then, the CPU determines whether or not the correction value X is equal to or larger than 1 (St 126). When determining that the correction value X is 0, the CPU performs printing and cutting (St 131).

When determining that the correction value X is equal to or larger than 1, the CPU determines whether or not the number of columns corresponding to the clearance 53 is equal to or larger than 1 (St 123). When determining that the number of columns corresponding to the clearance 53 is equal to or larger than 1, the CPU repeats the deletion of the clearance 53 until the correction value X becomes 0 or the number of columns corresponding to the clearance 53 becomes 0. When determining that the number of columns corresponding to the clearance 53 is 0, the CPU deletes the blank 52. Specifically, as described above, a comparison is made in terms of the number of columns corresponding to the left blank 52a of the character and that of the right blank 52b, and one column is deleted from the blank 52 of which the number of columns is larger. The CPU determines whether or not the number of columns corresponding to the blank 52 is equal to or larger than 1 (St 127). When determining that the number of columns corresponding to the blank 52 is equal to or larger than 1, the CPU deletes the blank 52 by one column (St 128). Then, the CPU subtracts 1 from the correction value X (St 129). When the number of columns corresponding to the blank 52 is 0, the CPU performs printing and cutting (St 131) and ends this routine.

Then, the CPU determines whether or not the correction value X is equal to or larger than 1 (St 130). When determining that the correction value X is equal to or larger than 1, the CPU determines whether or not the number of columns corresponding to the blank 52 is equal to or larger than 1 (St 127). When determining that the number of columns corresponding to the blank 52 is equal to or larger than 1, the CPU repeats deletion of the blank 52 until the correction value X or the number of columns corresponding to the blank 52 becomes 0. When determining that at least one of the correction value X and the number of columns corresponding to the blank 52 becomes 0, the CPU performs printing and cutting (St 131) and ends this routine. When the correction value X and the number of columns corresponding to the blank 52 are equal to or larger than 1 and 0, respectively, the character string may be reduced and then printed, or an alarm may be displayed on the display section 14.

In the above description, the minus correction is performed to delete the clearance 53 and blank 52; however, plus correction that inserts the clearance may be performed to increase the width of the character string. In this case, a comparison is made in terms of the number of the columns corresponding to the clearance 53 and blank 52 between the characters, and the clearance 53 is added by one column to the area where the number of columns corresponding to the blank 52 and clearance 53 is smaller.

Figure 11A:
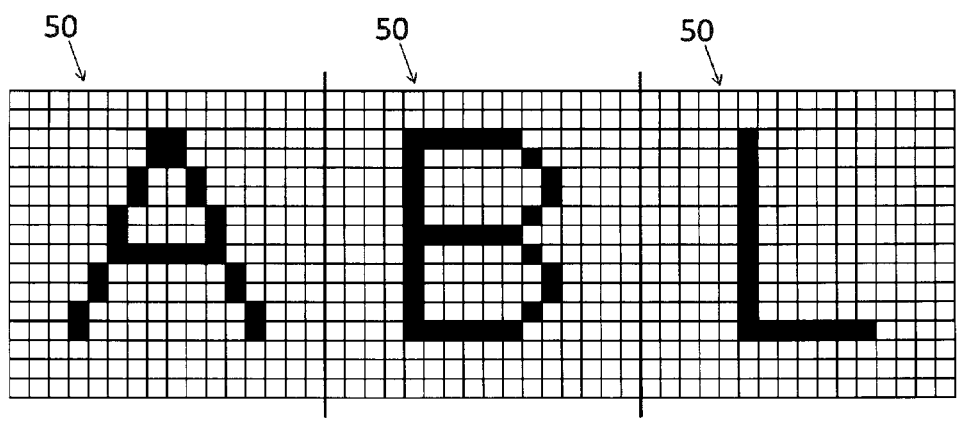

For example, when four-column clearance 53 is added to the character string "ABL" of FIG. 11A, the clearance 53 and blank 52 are detected or read out. In the example of FIG. 11A, the number of columns corresponding to the clearance 53 is 0, the number of columns corresponding to the left blank 52a of "A" is 3, the number of columns corresponding to the right blank 52b of "A" is 3, the number of columns corresponding to the left blank 52a of "B" is 4, the number of columns corresponding to the right blank 52b of "B" is 4, the number of columns corresponding to the left blank 52a of "L" is 5, and the number of columns corresponding to the right blank 52b of "L" is 4. The number of columns existing between the valid dot 51 of "A" and the valid dot 51 of "B" is 7 and the number of columns existing between the valid dot 51 of "B" and the valid dot 51 of "L" is 9. This time, the clearance 53 is not inserted into the left blank 52a of the left end character and the right blank 52b of the right end character, but inserted between the characters.

Figure 11B:
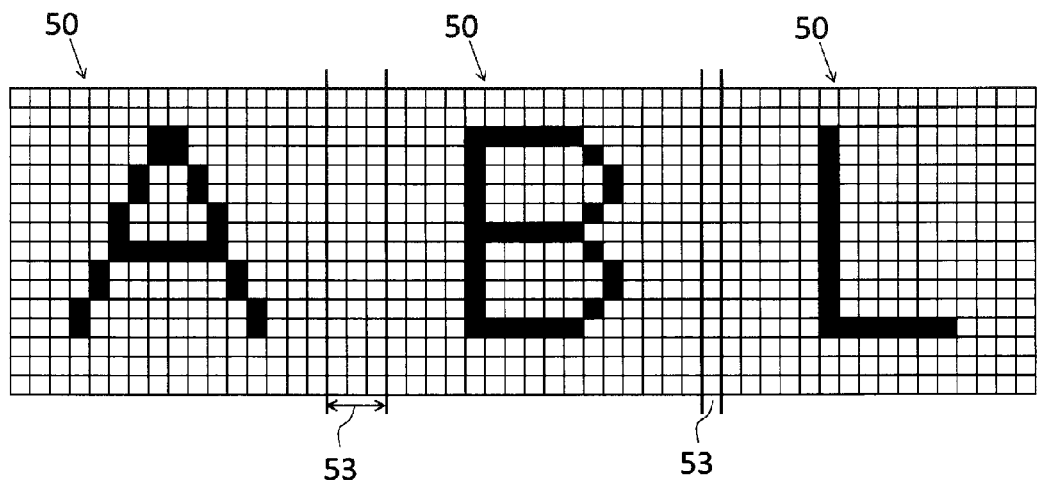

First, when the blank 52 between "A" and "B" and blank 52 between "B" and "L" are compared to each other in terms of width (the number of columns), the width of the blank 52 between "A" and "B" is smaller, so that the clearance 53 is inserted by one column between "A" and "B". Then, the blank and clearance 53 (eight-column width) between "A" and "B" and blank 52 (nine-column width) between "B" and "L" are compared to each other, and the clearance 53 is inserted by one column between "A" and "B" once again. The blank 52 and clearance 53 between "A" and "B" and blank 52 between "B" and "L" have the same column-width (nine-column width), the clearance 53 is inserted by one column to the area (between "B" and "L") different from the area into which the clearance 53 is inserted previously. Finally, the blank 52 and clearance 53 (nine-column width) between "A" and "B" and blank 52 and clearance 53 (ten-column width) between "B" and "L" are compared to each other, and the clearance 53 is inserted by one column between "A" and "B". FIG. 11B illustrates the result of insertion of the four-column clearance 53. When this character string data is printed, a print result in which characters are arranged in a better balance than when the clearance 53 is inserted uniformly can be obtained.

(Effects)

Effects of the tube printer 1 according to the present embodiment will be described below.

In the present embodiment, when the print length of an input character string is corrected, a comparison is first made in terms of the length of the blank 52 in each character and/or clearance 53 between characters. In a case where the minus correction is performed to reduce the print length, the blank 52 or clearance 53 is deleted by one column at a time preferentially from the area where the length of the blank 52 and/or clearance 53 is larger; while in a case where the plus correction is performed to increase the print length, the clearance 53 is added by one column at a time preferentially to the area where the length of the blank 52 and/or clearance 53 is smaller. Thus, a print result having a good balance between characters in the print area can be obtained.

Further, in the case of the minus correction, the blank 52 in each character data can be deleted, so that the print length can be corrected without reducing the valid dot 51 to a maximum extent.

In the present embodiment, the blank 52 or clearance 53 is deleted/inserted by one column at a time for correction of the print length; however, the blank 52 or clearance 53 corresponding to a plurality of columns may be deleted/inserted at a time. Further, although alphabet is used as an example of the character string in the present embodiment, all types of character, such as Kanji, Kana, alphanumeric symbol may be used. Further, although the character string is printed in the horizontal direction in the present embodiment, it may be printed in the vertical direction. Further, in a case where the table concerning the blank information is created in advance, a detecting unit for detecting the blank is not necessary, but a larger ROM capacity is required. In a case where the table is created each time, a larger ROM capacity is not necessary, but a longer algorism processing time is taken. Which one to choose may be determined in consideration of the entire system.

Further, in the present embodiment, the operator inputs a character string or a correction value through a keyboard of the input section 13; however, the character string or correction value may be transmitted to the tube printer 1 from another device (personal computer, etc.) connected to the tube printer 1 wirelessly or by wire.

Further, in the present embodiment, the tube printer that uses the tube T as a recording medium is taken as an example of the printer device 1; however, the present invention may be applicable to various printer devices that perform printing on various types of medium, such as a label, a marking plate, a plate or a card.

This application is based upon and claims the benefit of priority from prior Japanese Patent Applications No. 2015-179531, the entire contents of which are incorporated herein by reference.

What is claimed is:

1. A printer device that prints a character string on a recording medium having a predetermined area, comprising:
    a character string acquisition unit that acquires the character string to be printed;
    a correction value acquisition unit that acquires a correction value for use in correction of a print length of the character string;
    a blank column part acquisition unit that detects or reads out a blank column part existing in each character data in the character string;
    a control unit that corrects the print length of the character string based on the correction value; and
    a print unit that prints the character string corrected by the control unit, wherein
    the control unit makes a comparison in terms of the length of the blank column part in each character data acquired by the blank column part acquisition unit and performs the correction so as to increase or decrease the print length of the character string based on the comparison result.

2. The printer device according to claim 1, wherein
    the character data is represented in a specified number of rows and columns of dots and constituted of a valid dot column part in which one or more dot data are included in each column and a blank column part positioned on one side or both sides of the valid dot column part, in which no dot data is included in each column, and
    the blank column part acquisition unit acquires the blank column part in the character data.

3. The printer device according to claim 1, wherein
    the correction value is a value for reducing the print length, and
    the control unit deletes the blank column part by a predetermined number of columns at a time preferentially from the blank column part having a larger length to correct the print length.

4. The printer device according to claim 3, wherein
    the control unit makes a comparison in terms of the length of the blank column part between the valid dot column parts of adjacent charter data in the character string and deletes the blank column part by a predetermined number of columns at a time preferentially from the blank column part between the valid dot parts having a larger length to correct the print length.

5. The printer device according to claim 1, wherein
    the correction value is a value for increasing the print length, and
    the control unit adds the blank column part by a predetermined number of columns at a time preferentially to the blank column part having a smaller length to correct the print length.

6. A printer device that prints a character string on a recording medium having a predetermined area, comprising:
    a character string acquisition unit that acquires the character string to be printed;
    a correction value acquisition unit that acquires a correction value for use in correction of a print length of the character string;
    a blank column part/clearance column part acquisition unit that detects or reads out a blank column part in each character data and a clearance column part between adjacent character data in the character string;
    a control unit that corrects the print length of the character string based on the correction value; and
    a print unit that prints the character string corrected by the control unit, wherein
    the control unit makes a comparison in terms of the total length of the blank column part and clearance column part between one character data and another character data acquired by the blank column part/clearance column part acquisition unit and performs the correction so as to increase or decrease the print length of the character string based on the comparison result.

7. The printer device according to claim 6, wherein
    the character data is represented in a specified number of rows and columns of dots and constituted of a valid dot column part in which one or more dot data are included in each column and a blank column part positioned on both sides of the valid dot column part, in which no dot data is included in each column, and
    the blank column part/clearance column part acquisition unit acquires the blank column part and clearance column part in the character data.

8. The printer device according to claim 6, wherein
    the correction value is a value for reducing the print length, and the control unit deletes the clearance column part by a predetermined number of columns at a time preferentially from the clearance column part included in the area where the total length of the blank column part and clearance column part is larger to correct the print length.

9. The printer device according to claim 8, wherein
the control unit makes a comparison in terms of the total length of the blank column part and clearance column part between the valid dot column parts of adjacent charter data in the character string and deletes the clearance column part by a predetermined number of columns at a time preferentially from the clearance column part included in the area where the total length of the blank column part and clearance column part between the valid dot column parts is larger to correct the print length.

10. The printer device according to claim 8, wherein
based on the correction value, the control unit deletes first the clearance column part and then deletes the blank column part.

11. The printer device according to claim 6, the correction value is a value for increasing the print length, and
the control unit adds the blank column part or clearance column part by a predetermined number of columns at a time preferentially to the blank column part and clearance column part included in the area where the total length of the blank column part and clearance column part is smaller to correct the print length.

12. A printer device that prints a character string on a recording medium having a predetermined area, comprising:
a character string acquisition unit that acquires the character string to be printed;
a correction value acquisition unit that acquires a correction value for use in correction of a print length of the character string;
a clearance column part acquisition unit that detects or reads out a clearance column part between adjacent character data in the character string;
a control unit that corrects the print length of the character string based on the correction value; and
a print unit that prints the character string corrected by the control unit, wherein
the control unit makes a comparison in terms of the length of the clearance column part between the adjacent character data acquired by the clearance column part acquisition unit and performs the correction so as to increase or decrease the print length of the character string based on the comparison result.

13. The printer device according to claim 12, wherein
the correction value is a value for reducing the print length, and
the control unit deletes the clearance column part by a predetermined number of columns at a time preferentially from the clearance column part having a larger length to correct the print length.

14. The printer device according to claim 12, wherein
the correction value is a value for increasing the print length, and
the control unit adds the clearance column part by a predetermined number of columns at a time preferentially to the clearance column part having a smaller length to correct the print length.

* * * * *